(12) United States Patent
Weisbeck, III

(10) Patent No.: US 7,021,689 B1
(45) Date of Patent: Apr. 4, 2006

(54) VEHICLE BED EXTENSION DEVICE

(76) Inventor: Leonard A. Weisbeck, III, 1175 Sullivan Rd., Alden, NY (US) 14004

( * ) Notice: Subject to any disclaimer, the term of this patent is extended or adjusted under 35 U.S.C. 154(b) by 0 days.

(21) Appl. No.: 10/772,523

(22) Filed: Feb. 5, 2004

(51) Int. Cl.
B62D 33/03 (2006.01)

(52) U.S. Cl. .................................. 296/26.11; 296/57.1

(58) Field of Classification Search ............... 296/191, 296/51, 57.1, 37.6, 26.08, 26.11
See application file for complete search history.

(56) References Cited

U.S. PATENT DOCUMENTS

| | | | |
|---|---|---|---|
| 4,023,850 A | 5/1977 | Tillery | |
| 4,472,639 A | 9/1984 | Bianchi | |
| 4,531,773 A | 7/1985 | Smith | |
| 5,765,892 A | 6/1998 | Covington | |
| 5,775,759 A * | 7/1998 | Cummins | ............... 296/26.11 |
| 5,816,637 A | 10/1998 | Adams et al. | |
| 5,816,638 A | 10/1998 | Pool, III | |
| 5,826,932 A | 10/1998 | DeSimone | |
| 5,857,724 A * | 1/1999 | Jarman | ............... 296/26.11 |
| 5,902,000 A | 5/1999 | Wold | |
| 5,924,753 A | 7/1999 | DiBassie | |
| 5,941,588 A | 8/1999 | Marconi | |
| 5,988,725 A | 11/1999 | Cole | |
| 6,007,127 A * | 12/1999 | Garofalo | ............... 296/26.11 |
| 6,053,554 A | 4/2000 | Doniaz | |
| 6,082,801 A | 7/2000 | Owen et al. | |
| 6,142,548 A | 11/2000 | Kuhn et al. | |
| 6,155,622 A | 12/2000 | Reed | |
| 6,378,926 B1 | 4/2002 | Renze et al. | |
| 6,422,627 B1 | 7/2002 | Kuhn et al. | |
| 6,422,630 B1 | 7/2002 | Heaviside | |
| 6,513,850 B1 | 2/2003 | Reed | |
| 6,550,836 B1 * | 4/2003 | Rigau | ............... 296/37.6 |
| 6,568,733 B1 | 5/2003 | Lacy | |
| 6,609,743 B1 | 8/2003 | Stevenson | |
| 6,616,208 B1 | 9/2003 | Bauer | |
| 6,626,478 B1 | 9/2003 | Minton | |
| 6,641,190 B1 | 11/2003 | Kirchhoff | |
| 6,648,391 B1 | 11/2003 | Whiteford et al. | |
| 2002/0000732 A1 * | 1/2002 | Sanders | ............... 296/26.08 |
| 2002/0006317 A1 | 1/2002 | Hofmann et al. | |
| 2002/0121794 A1 | 9/2002 | Veinar | |
| 2002/0140244 A1 | 10/2002 | Kuhn et al. | |
| 2003/0116986 A1 | 6/2003 | Ootsuka et al. | |
| 2003/0127873 A1 | 7/2003 | Reed | |
| 2003/0136595 A1 | 7/2003 | Lacy | |
| 2003/0137160 A1 | 7/2003 | Lacy | |

* cited by examiner

*Primary Examiner*—Jason Morrow
(74) *Attorney, Agent, or Firm*—James C. Simmons

(57) ABSTRACT

An assembly for attachment detachably to the tailgate of a vehicle for extending the vehicle bed length. The assembly comprises a plate which is detachably attachable to the tailgate, a panel hingedly connected to the upper edge of the plate for serving as an alternative tailgate, and at least one side panel hingedly connected to a side edge of said plate. A pair of cables extend from the alternative tailgate for attachment to the vehicle for deploying the alternative tailgate in an open position.

17 Claims, 4 Drawing Sheets

VEHICLE BED EXTENSION DEVICE

The present invention relates generally to trucks and other vehicles having tailgates. More particularly, the present invention relates to assemblies for increasing bed space of such vehicles.

Truck beds have long been provided with tailgates (with plastic bed inserts) hinged to the rear ends thereof to be operable between a closed position wherein the tailgate is vertical and an open position wherein the tailgate extends horizontally from the rear end of the bed. SUVs and other vehicles may similarly have tailgates. The tailgate is held in the open position by cables extending upwardly from sides of the tailgate to the vehicle body. A tailgate typically has a height, when closed, of about 2 feet and a width equal generally to the width of the vehicle.

In recent years, many truck owners have begun installing large tool boxes or fuel tanks near the forward ends of the beds. As a result, they have found their cargo capacity to be greatly diminished (by as much as 2 feet in bed length, for example, from a bed size of 8 ft. by 5 ft. to an effective bed size of 6 ft. by 5 ft. or from a bed size of 6 ft. by 5 ft. to an effective bed size of 4 ft. by 5 ft.). As a result, it has become highly desirable to temporarily increase the bed size for increased cargo capacity. There is an acutely felt need to provide a good workable bed extension, as evidenced by the following exemplary U.S. patents/published applications:

Appl. Pub. 2002/0006317
| | | | | |
|---|---|---|---|---|
| 5,902,000 | 4,023,850 | 5,826,932 | 6,053,554 | 6,616,208 |
| 5,816,638 | 4,531,773 | 5,941,588 | 6,082,801 | 6,626,478 |
| 5,857,724 | 5,765,892 | 5,924,753 | 6,378,926 | 6,641,190 |
| 4,472,639 | 5,816,637 | 5,988,725 | 6,609,743 | 6,648,391 |
| 6,422,630 | | | | |

6,422,627 (related to appl. pub. 2002/0140244)
6,513,850 (related to appl. pub. 2003/0127873)
6,568,733 (related to appl. pubs. 2003/0137160 and 2003/0136595)
Appl. Pub. 2003/0116986
Appl. Pub. 2002/0121794

Appl. Pub. 2002/0006317 to Hofmann et al discloses a truck cargo floor extender which includes a panel hingedly mounted to the upper edge of the tailgate and a pair of wings mounted pivotally to the ends of the panel. The free ends of the wings are joined to the sides of the truck. Cargo space is extended by lowering the existing truck tailgate, pivoting the panel to a vertical position and opening the wings on either side to engage the sides of the truck. The panel is hinged to the top edge of the tailgate so that it may, from a stored position alongside the tailgate be rotated 90 degrees so that it becomes perpendicular to the tailgate after the tailgate is lowered to a horizontal position. Claim 1 thereof recites that the pair of wing panels are coupled to "one of the rear panel or the tailgate".

Hofmann et al undesirably does not provide suitable structure to allow the rear panel to be deployed in a horizontal (open) position for loading and unloading the truck. Moreover, the structure of Hofmann et al is not easily and quickly installable on an existing truck and is not installable so as to be easily and quickly removable from the truck.

U.S. Pat. No. 4,472,639 to Bianchi discloses a removable tailgate extender structure for trucks wherein a back and side panels are compactly carried against the inside surface of the closed tailgate when not in use while being pivotable into perpendicular relationship to the opened tailgate to increase cargo space. The back panel is hingedly attached to the tailgate, and the side panels are hingedly attached to sides respectively of the back panel.

In an aspect of his invention which does not appear to be shown or otherwise disclosed in the specification and drawings, Bianchi states, at col. 2, lines 14 to 16, that each of a pair of second hinges is "connected between a separate side of the tailgate and a separate one of the side panels".

At col. 1, line 66, to col. 2, line 2, of Bianchi, it is stated that the panels are enabled for pivoting between the retracted position wherein the panels are parallel to the tailgate surface and the extended position wherein the panels extend substantially perpendicularly from the tailgate surface when the tailgate is at the open position.

Bianchi suffers from the same inadequacies as Hofmann et al.

U.S. Pat. No. 5,902,000 to Wold discloses a vehicle bed extender for attaching to a tailgate. The vehicle bed extender has a rear panel the inner edge of which is hinged to the outer border of the tailgate. Side panels are provided in which the bottom edges thereof are hinged to the side border of the tailgate. The outer edges of the side panels are hinged to the outer edges of the rear panel by hinges, the hinge being releasable to allow the rear panel to be opened or dropped down. The side panels have a diagonal hinge which folds inwardly when the rear panel is pushed toward the tailgate into a stowed position.

Wold also suffers from the same inadequacies as Hofmann et al.

U.S. Pat. No. 5,816,638 to Pool, III discloses a pickup truck bed extender which comprises a gate member and sidewalls. The sidewalls are bolted to the truck body. The gate member is pivotally attached to the sidewalls (or to the pickup truck as a standard pickup truck tailgate without the extending sidewalls). The gate can extend vertically to close the back of the truck bed or be folded down to either allow entrance to the truck storage area or to utilize a built-in loading ramp. A detachable cable with loop connectors on each end is attached to the gate member and extends to the sidewall end edges to limit how far the gate member may be opened.

Like the Hofmann et al, Bianchi, and Wold patent documents, the structure of Pool, III is not easily and quickly installable on an existing truck and is not installable so as to be easily and quickly removable from the truck.

There thus remains a felt need in spite of the large number of patents and applications for a bed extension which allows an alternative tailgate to be deployed in both open (horizontal) and closed positions and which is easily and quickly installable on an existing truck and so as to be easily and quickly removable from the truck.

It is accordingly an object of the present invention to provide a vehicle bed extension which is easily and quickly installable on an existing vehicle and so as to be easily and quickly removable from the vehicle.

It is another object of the present invention to provide a vehicle bed extension which allows an alternative tailgate to be deployed in both open (horizontal) and closed positions.

In order to provide a vehicle bed extension which is easily and quickly installable on an existing vehicle and so as to be easily and quickly removable from the vehicle, in accordance with the present invention, an extension assembly includes a plate to which both a alternative tailgate panel and side panels are hingedly connected, the plate being easily and quickly attachable to and detachable from the tailgate.

In order to provide a vehicle bed extension which allows an alternative tailgate to be deployed in both open (horizontal) and closed positions, in accordance with the present invention, an alternative tailgate panel and side panels are hingedly connected to the vehicle tailgate so that the alternative tailgate panel is pivotable relative to the tailgate to the open position when the tailgate is in an open position and held in the open position by at least one cable or other suitable means.

The above and other objects, features, and advantages of the present invention may be found in the hereinafter detailed description of the preferred embodiment when read in conjunction with the accompanying drawings wherein the same reference numerals denote the same or similar parts throughout the several views.

DETAILED DESCRIPTION OF THE PREFERRED EMBODIMENT

Figure 2:
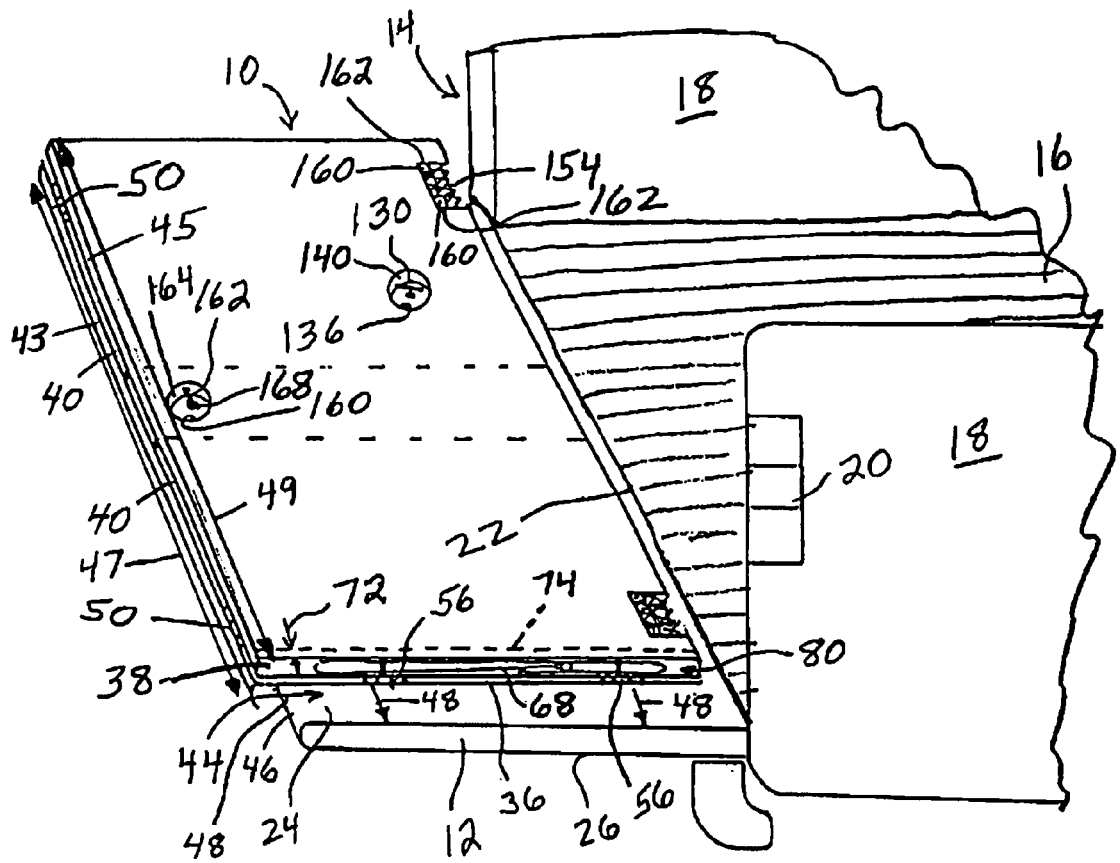
FIG. 2 is a partial perspective view thereof with the assembly folded up and illustrating attachment thereof to the truck.

Referring to FIG. 2, there is illustrated generally at 10 an alternative tailgate assembly being put in position for attachment detachably to a standard tailgate 12 of a truck 14, the truck 14 having a cargo bed 16 between a pair of side walls 18 each having a rear lighting assembly 20. The tailgate 12 is hingedly attached to the rear edge 22 of the bed 16.

The tailgate 12 is movable between an open position, illustrated in FIG. 2, wherein the tailgate 12 forms an angle of about 180 degrees with the bed 16 and has generally horizontal upper and lower surfaces 24 and 26 respectively so that items may be easily loaded into and unloaded from the truck, and a closed position wherein the tailgate 12 is upright, extends vertically from the bed edge 22, and the upper and lower surfaces 24 and 26 respectively become inner (facing the bed 16) and outer surfaces respectively. The tailgate 12 is held in the open position by a pair of conventional cables, illustrated at 28, one end of each of which is hooked on a pin 30 on a side surface of the tailgate 12 and the other end of which is attached to a pin 32 on the respective side wall of the truck 14, as is conventionally known in the art. The inner surface 24 of the tailgate is typically covered by a plastic insert (not shown) which should normally be removed before attachment of the assembly 10.

Illustrated at 34 in the forward portion of the bed is a permanently installed tool box, which takes up a substantial portion of the bed space (for example, about 2 feet by the bed width) and thus reduces substantially the loading capacity of the truck. The assembly 10 is provided to increase the bed capacity by lengthening the bed by as much as the width of the tailgate 12 (typically about 2 feet).

In order that the vehicle bed extension assembly 10 may be easily and quickly installed on the vehicle 14 and so as to be easily and quickly removable from the vehicle 14, in accordance with the present invention, the extension assembly 10 includes a plate 36 to which both an alternative tailgate panel 38 and side panels 40 are hingedly connected (as discussed hereinafter), the plate 36 being easily and quickly attachable to and detachable from the tailgate 12 (after the plastic insert cover normally provided is removed therefrom). Thus, the plate 36, which may be composed of steel having a thickness of, for example, about 1/16 inch, or a suitable thickness of polished diamond-plated aluminum (which is desirably substantially lighter in weight) or other suitable material, has generally the same size (same width and length) as the tailgate surface 24 and is easily and quickly attachable to the inner tailgate surface 24 by a plurality of screws, illustrated at 42, or other suitable means. One edge portion of the plate is bent or shaped to define a lip, illustrated at 44, which covers the upper edge 46 (when the tailgate 12 is up or in the closed position) of the tailgate 12 and helps to locate the plate 36, as illustrated by arrows 48 in FIG. 2, for attaching the assembly 10 to the tailgate 12.

The alternative tailgate panel 38 has a thickness of, for example, about 2½ inches and has a similar size (generally the same length and width) as plate 36. Panel 38 is a generally box-like structure composed of plates similar in thickness to that of plate 36 and composed of similar material, the plates being suitably bent and/or welded and reinforced as needed in accordance with good engineering practice.

Figure 1:
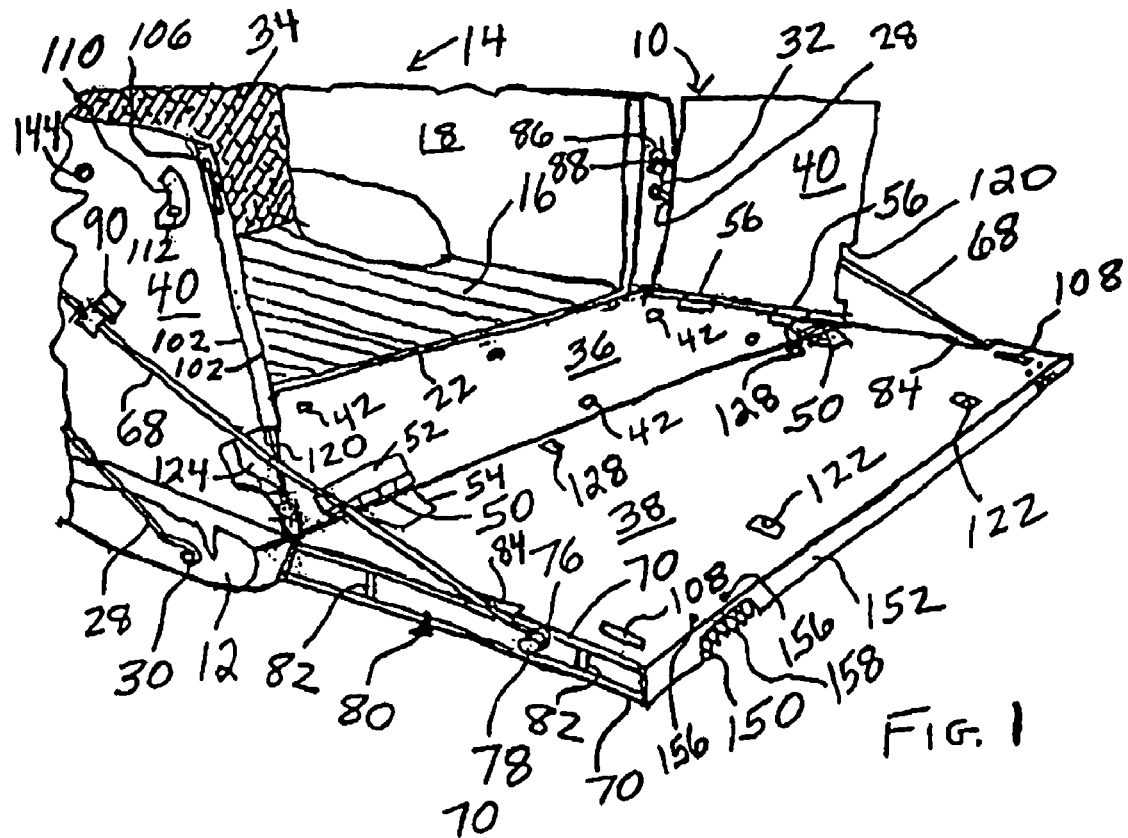
FIG. 1 is a partial perspective view of a truck having attached thereto an assembly which embodies the present invention in an open position.
Figure 3:
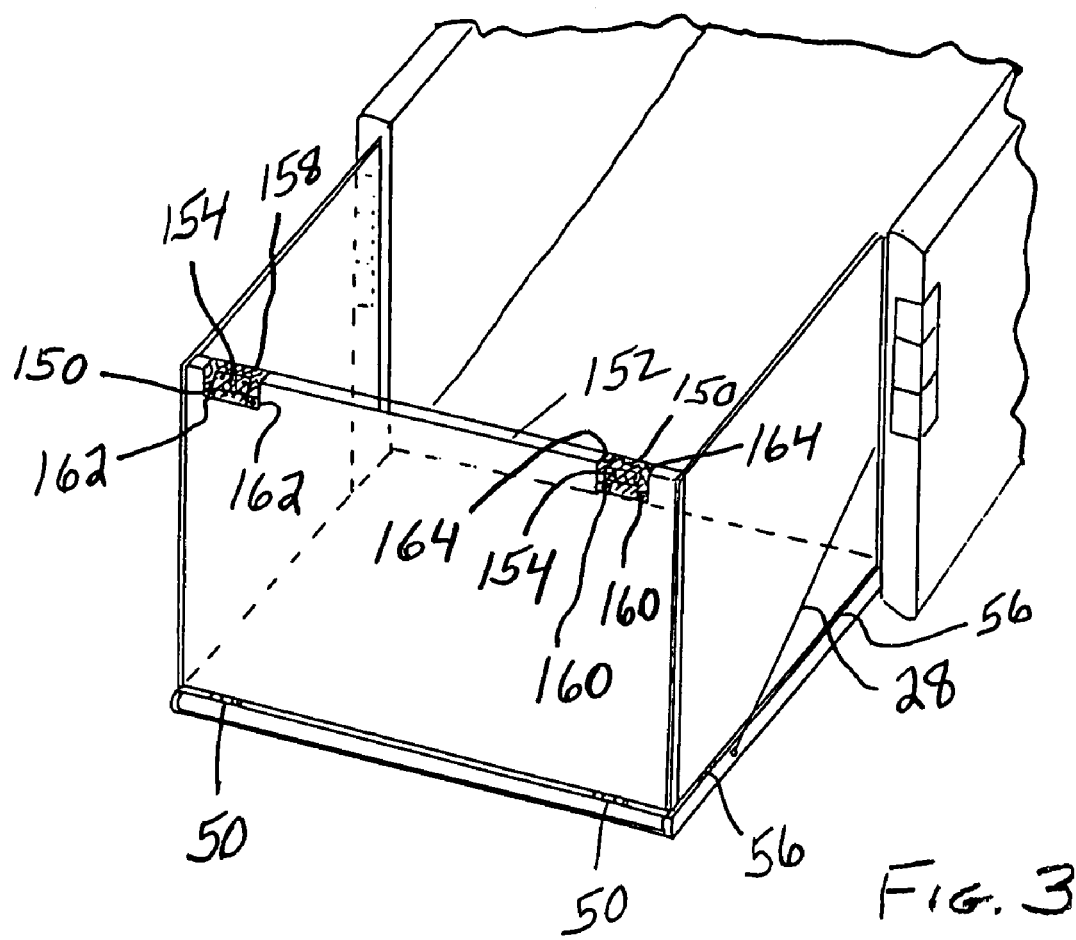
FIG. 3 is a generally schematic perspective view thereof with the assembly deployed in a closed position.

The alternative tailgate panel 38 is suitably hinged (along the upper edges when the tailgate 12 is in the closed position and along the upper surfaces when the alternative tailgate panel 38 is in the open position as illustrated in FIG. 1) by a pair of suitable spaced hinges, illustrated at 50, to the plate 36 to allow the panel 38 to rotate or pivot relative to plate 36 through 180 degrees from its position in FIG. 2 horizontal and overlying the plate 36 to its position in FIG. 1 wherein it is horizontal but lying edge-to-edge with plate 36 so as to extend rearwardly therefrom. This allows the alternative tailgate 38 to desirably be deployed in the open position, illustrated in FIG. 1, for loading and unloading as well as in the closed position illustrated in FIG. 3 and also allows it to be folded over onto the plate 36 and side panels 40, as illustrated in FIG. 2, for storage of the assembly against the inner surface 24 of the tailgate 12 when not needed. The hinge members 52 and 54 are suitably welded and/or riveted or otherwise suitably attached to the plate 36 and panel 38 respectively. As seen in FIG. 2, the hinges 50 connect the plate 36 to the panel 38 along their edges 43 and 45 respectively. As also seen in FIG. 3, the length 47 of edge 43 is substantially equal to the length 49 of edge 45.

Each of the side panels 40 has a thickness of, for example, about 5/8 inch and has generally the same height as the height of panel 38 and generally the same width as that of plate 36. Panels 40 are constructed similarly to the construction of panel 38, i.e., they are generally box-like structures composed of plates similar in thickness to that of plate 36 and composed of similar material, the plates being suitably bent and/or welded and reinforced as needed in accordance with good engineering practice. It should be understood that the present invention does not require that the side panels as well as alternative tailgate panel be box-like structures composed of plates, for example, it is envisioned that a panel may be composed of a single plate.

Figure 8:
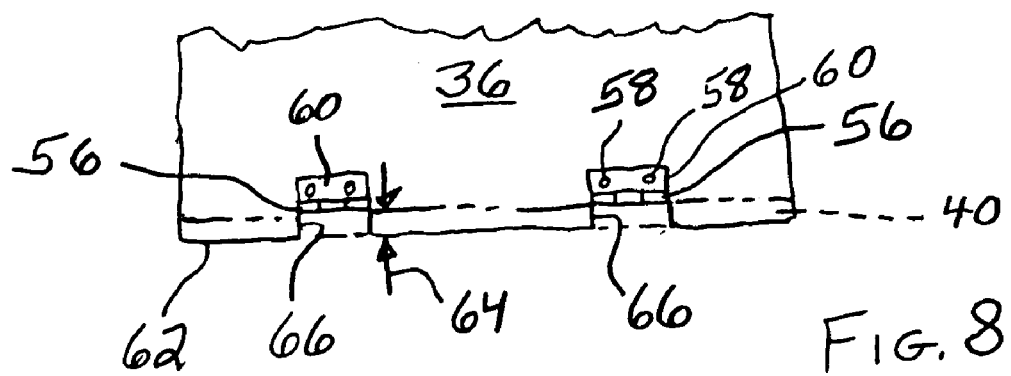
FIG. 8 is an enlarged plan view of a portion of the assembly.

Each of the side panels 40 is suitably hinged (along the side edges of the plate 36 and bottom edges of the side panels) by a pair of suitable spaced hinges, illustrated at 56, to the plate 36 to allow each of the panels 40 to rotate or pivot relative to plate 36 through 90 degrees from its position in FIG. 2 horizontal and overlying the plate 36 to its vertical position as illustrated in FIGS. 1 and 8. The hinge members 52 and 54 are suitably welded and/or riveted or otherwise suitably attached, such as by screws 58 to the plate 36 and panel 40 respectively. The hinge mounting members 60 for mounting of the hinges 56 to the plate 36 are positioned inwardly of the respective side edge 62 of the plate 36 a distance, illustrated at 64, of, for example, about ¾ inch (or generally about the thickness of the respective side panel 40) so that, when the side panel 40 is in the raised position, as illustrated in FIGS. 1 and 8, the outer planar surface of the side panel 40 is flush with the side edge of the plate 36, as seen in FIG. 8. In addition to aesthetics, this desirably keeps the side panels 40 positioned generally between the positions of FIGS. 1 and 2. A pair of notches or cutouts, illustrated at 66, may be provided in each side edge of the plate 36 between the hinges 56 respectively and the side edge so that the side panels 40 may better lie flat in the closed position.

In addition to restraint provided by hinges 50, the alternative tailgate panel 38 is supported against downward movement from its horizontal position shown in FIG. 1 by a pair of cables 68. The side edge portions of the alternative tailgate panel 38 are suitably formed to define a cavity or channel, illustrated at 80 in FIG. 1, over the width thereof between plates 70 forming the panel 38 and extending inwardly a distance, illustrated at 72 in FIG. 2, of, for example, about 1 inch, to an inner wall, illustrated at 74, defined by a plate. One end of each cable 68 has an eyelet 76 which is swingedly (loosely) received on a screw 78 which is threadedly received in the wall 74 so as to not protrude from the cavity 80. The head of the screw 78 retains the eyelet 76 thereon. A pair of spaced rods 82 extend in the cavity 80 between the plates 70 and are welded or otherwise suitably attached thereto and are positioned to retain the respective cable 68 is a folded stored position within the cavity 80, as illustrated in FIG. 2. A notch, illustrated at 84, is provided in the side edge of the upper plate 70 to receive the cable when it is removed from the cavity 80 and deployed to support the alternative tailgate panel 38, as illustrated in FIG. 1. The opposite end of each cable 68 has an eyelet, illustrated at 86, for clipping on an existing pin, illustrated at 88, on the respective truck side wall 18 which normally lockingly receives the tailgate 12. The eyelet 86 is, for example, of a type which has an larger eyelet portion to be received over the pin head and a smaller eyelet portion emanating therefrom for tightly grasping the shank of the pin. However, the clip for the opposite cable end will vary depending upon the pin arrangement or the like for each type of vehicle.

Figure 4:
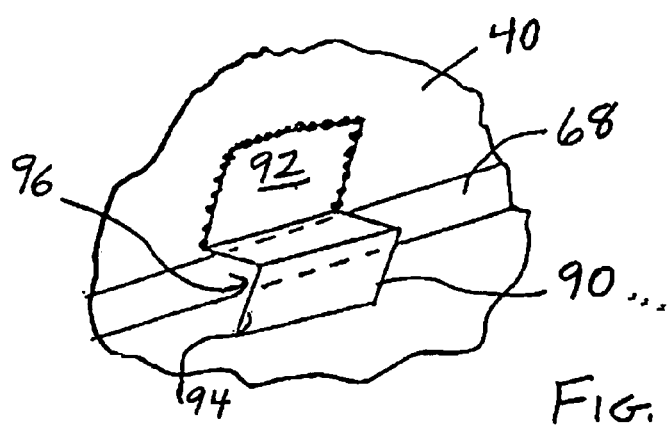
FIG. 4 is an enlarged cutaway view of a member for securing the position of a cable for holding a alternative tailgate panel of the assembly in the open position.

Referring to FIGS. 1 and 4, a clip 90 has a portion 92 which is welded or otherwise suitably attached to each side panel 40 and another portion 94 shaped to provide with the side panel 40 a channel, illustrated at 96, for receiving the respective cable 68 when the cable 68 is deployed for supporting the alternative tailgate panel in the horizontal position shown in FIG. 1. The member 90 is positioned in the path of the deployed cable 68 so that the cable 68 can be naturally and tautly received in the channel 96 as it is being deployed in order to maintain the respective side panel 40 in an upright or vertical position.

Figure 5:
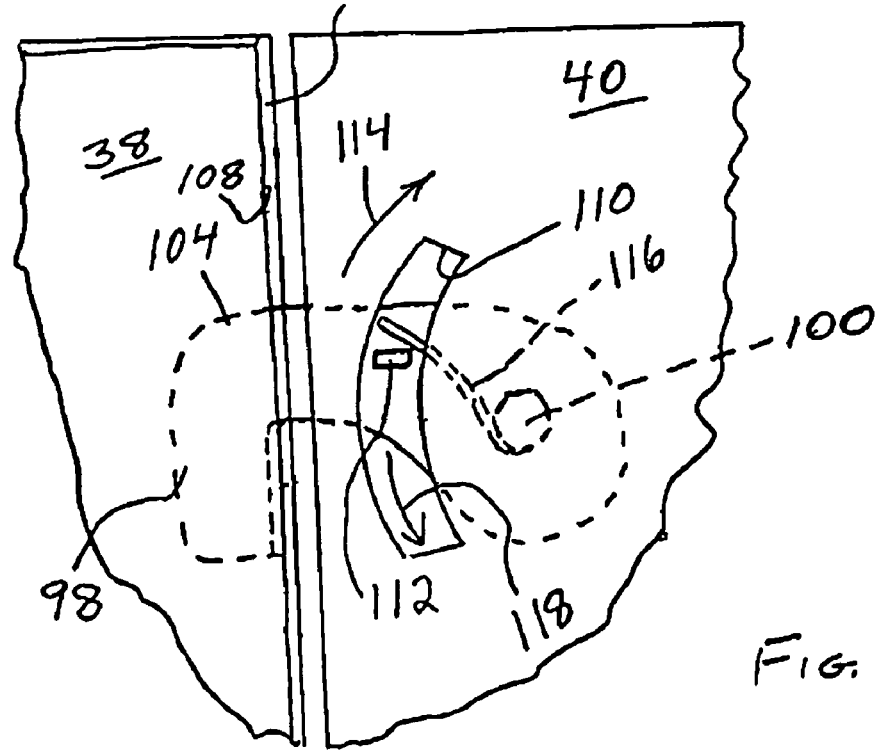
FIG. 5 is view similar to that of FIG. 4 of a latch for connecting a side panel of the assembly to the alternative tailgate panel for deployment thereof in the closed position.

In order to move the alternative tailgate panel 38 to a closed position, as illustrated in FIG. 3, the cables 68 are unhooked from the pins 88 respectively and folded and stored in the channels 80, and the alternative tailgate panel 38 is raised (rotated 90 degrees) to engage the rear edges of the side panels 40. Referring to FIG. 5, the alternative tailgate panel 38 is detachably attached to each of the side panels by a clip 98 which is rotatably received about a pin 100 which is mounted between plates 102 making up the respective side panel 40. The clip 98 has an eccentric portion 104 which extends through a slot, illustrated at 106 in FIG. 1, in the rear edge of the respective side panel 40 and is receivable through a respective slot, illustrated at 108 in FIGS. 1 and 5, in the inner plate 70 of the alternative tailgate panel 38. A slot, illustrated at 110, which is generally radiused about the pin 100, is provided in the outer one of plates 102, and a hand-hold member 112 is welded or otherwise suitably attached to the clip 98 and extends normal to the clip 98 and protrudes through the slot 110 for grasping by a person for rotating the clip 98. The clip 98 is spring-biased for movement in the direction, illustrated at 118, by spring 116, so that, when not used for attaching the panels 38 and 40, the clip eccentric portion 104 is biased to remain within the side panel 40. In order to attach the panels 38 and 40, the portion 112 is used to rotate the clip 98 in the direction illustrated at 114 against the bias of the spring 116 to effect movement of the eccentric portion 104 into position for insertion into the slot 108 after which it is firmly held in the slot 108 by the spring 116. For separating the panels 38 and 40, the member 112 is moved in the direction 114 against the force of the spring 116 and the eccentric portion 104 removed from slot 108, after which the member 112 is released with the result that the spring force effects movement of the eccentric portion 104 to its hidden position within the side panel 40.

Notches or cutouts, illustrated at 120, are suitably provided in the lower rear edges of the side panels 40 respectively to receive the hinge members 52 and 54, and reinforced recesses, illustrated at 122, are suitably provided in the upper plate 70 of the alternative tailgate panel 38 to receive the members 90, and cutouts, illustrated at 128, are suitably provided in the upper plate 70 of the alternative tailgate panel 38 to receive the hand-hold members 112 respectively, so that the side panels 40 may be folded flat onto the plate 36 and the alternative tailgate panel 38 may be folded flat onto side panels 40, as illustrated in FIG. 2, without obstruction or interference by the hinge members 52 and 54 or hand-hold members 112 or members 90. The cutouts 120 are each closed by a plate portion 124 which is suitably positioned intermediate the side panel plates 102.

Figure 6:
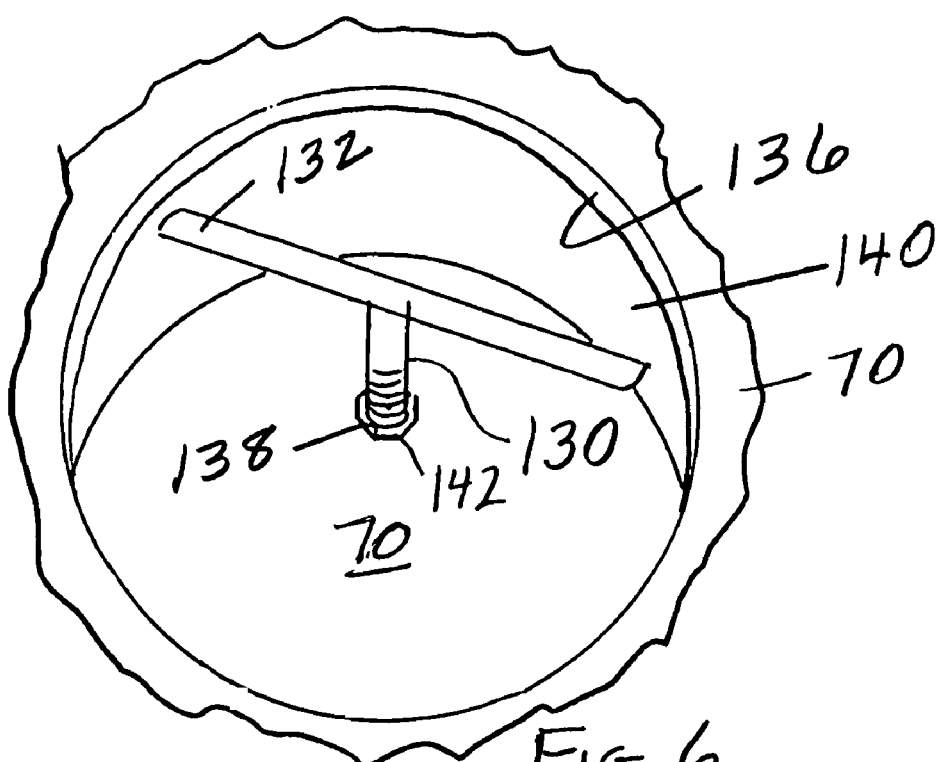
FIG. 6 is an enlarged partial perspective view of the assembly illustrating the connecting of the alternative tailgate panel to a side panel by a connector for holding the assembly in a stored position.
Figure 7:
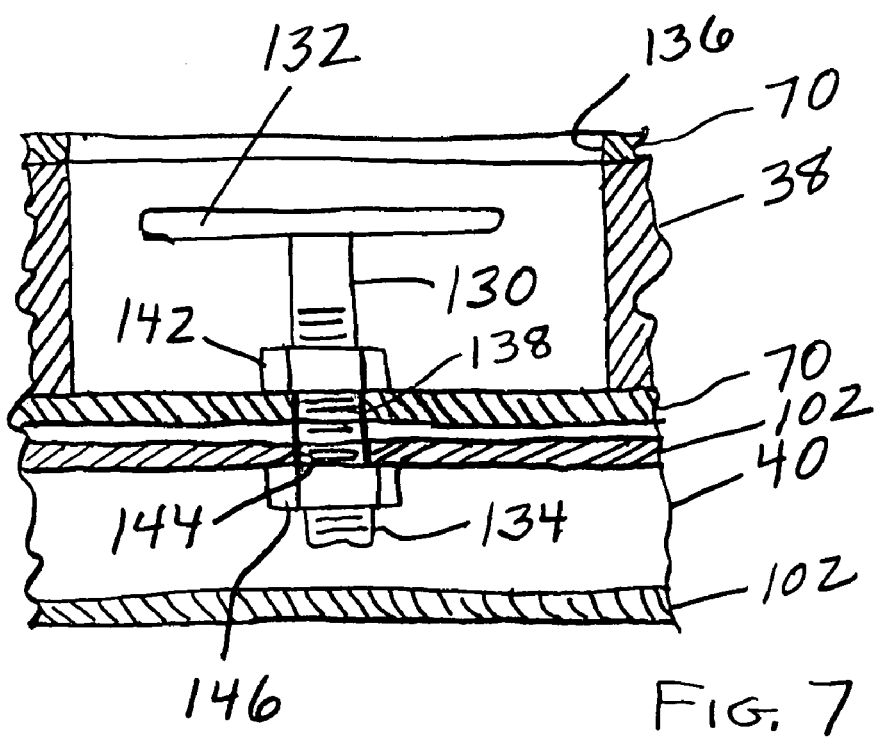
FIG. 7 is an enlarged sectional view of the connection of FIG. 6.

Referring to FIGS. 6 and 7, a bolt or screw 130 is suitably provided in order to secure the alternative tailgate panel 38 to one of the side panels 40 thereby securing all of the panels 38 and 40 together when the assembly 10 is stored next to the inner surface of the tailgate 12, as illustrated in FIG. 2. If desired, more than one such screw may be provided. The screw 130 has a T-head 132, as defined by a bar normal to its shank 134, or other suitable head. In order to unobstructively position the screw 130, a circular opening, illustrated at 136, is provided in the lower (when in the FIG. 1 position) plate 70 of panel 38, and an aperture, illustrated at 138, is provided generally concentric therewith in the upper plate 70. A reinforcing circular plate portion 140 is provided between the plates 70 and in surrounding relation to the opening 136. A nut 142 is welded or otherwise suitably affixed to the inner surface of the upper plate 70 to be aligned with the aperture 138. An aperture, illustrated at 144, is provided in the upper plate 102 of one of the side panels 40 and positioned to receive the shank 134 of screw 130 when in the FIG. 1 position. A nut 146 is welded or otherwise suitably affixed to the inner surface of the upper plate 102 and aligned with the aperture 144. The screw 130 is thus threadedly received in nut 142. For securing the panel 38 to panel 40, the screw 130 is manipulated by turning handle 132 so that the threaded shank 134 passes through aperture 144 and threadedly engages nut 146. Other suitable securing means may be provided, for example, the nut 146 may not be provided and the aperture 144 threaded for threadedly receiving the threaded shank 134.

In order to provide lights for the alternative tailgate panel 38, a recess, illustrated at 150, is provided in both the upper edge 152 and outer surface (when the alternative tailgate panel 38 is in the closed position as illustrated in FIG. 3) on each side thereof, and a stop/turn/tail light fixture 154 or other suitable light fixture is affixed therein such as by screws 156 (FIG. 1). A protective lattice-work cage 158 is provided to cover the recess 150 and is secured along the outer surface by a pair of screws 160 securing it to a pair of plate tabs 162, and a similar attachment means 164 at the edge corners, or by other suitable means. This position of the light fixture 154 advantageously permits its use when the alternative tailgate 38 is either the open or down position, as shown in FIG. 1, or in the closed or up position, as shown in FIG. 3.

A circular recess, illustrated at 160 in FIG. 2, reinforced by a circular plate 164 is formed centrally near the lower edge in the outer surface of the alternative tailgate panel 38. Electrical wiring 162 for the light fixture 154 is fed or led through the alternative tailgate panel 38 between the plates 70 and through a hole, illustrated at 166, in the circular plate 164 and is connected to a plug or connector, illustrated at 168, for connecting to the electrical system of the truck 14.

The present invention thus desirably allows quick and easy installation by merely screwing the plate 36 to the truck's tailgate 12 after first removing any plastic insert from the tailgate.

The stored assembly 10, which is generally out of the way (its total thickness may only be about 3 inches or less) while stored, may be quickly and easily opened to the position shown in FIG. 2 by placing the tailgate 12 in an open or down position, manipulating screw 130 to disconnect the alternative tailgate 38 from the side panel 40 to which it is connected, folding the alternative tailgate to the down or open position and the side panels to their upright positions while removing the cables 68 from their housings 80 and connecting them to the truck and allowing the cables 68 to be received within the respective clips 90, and connecting the lighting plug 168 to the truck's electrical system. This advantageously allows loading and unloading of the increased bed space.

The alternative tailgate 38 may be quickly and easily closed, as shown in FIG. 3, by disconnecting the cables 68 from the truck and storing them in the housings 80, moving the alternative tailgate 38 to the upright position, and manipulating the latch members 112 to latch the alternative tailgate 38 to the side panels 40, thereby allowing the desired increased bed space. It should be noted that, for movement of the alternative tailgate 38 between the open and closed positions, it is unnecessary to connect or disconnect the lighting fixture 154.

In making full use of the alternative tailgate 38 in both open and closed positions, it should be understood that the alternative tailgate 38 and the side panels 40 may be attached to the respective edges of the tailgate 12 in other ways, for example, by directly hingedly connecting them to respective tailgate edges or by hingedly connecting them to individual plates which are in turn connected to the tailgate at the respective edges thereof.

When it is desired to store the assembly 10, it is quickly and easily achieved by disconnecting the lighting wiring from the truck's electrical system, detaching and storing the cables (if the alternative tailgate is in the down or open position) or unlatching the alternative tailgate from the side panels (if the alternative tailgate is in the up or closed position), folding the side panels onto the plate 36, folding the alternative tailgate 38 onto the side panels 40, then manipulating the screw 130 to connect the alternative tailgate to one of the side panels so that the compact storage of the assembly 10 is maintained. The tailgate 12 may then be left open or closed, with the assembly 10 compactly stored against the inner surface of the tailgate 12.

The assembly 10 may be quickly and easily removed by simply unscrewing the plate 36 from the tailgate 12. When made of polished diamond-plated aluminum or other suitable light weight material, the assembly 10 may be easily carried by a person.

It should be understood that, while the present invention has been described in detail herein, the invention can be embodied otherwise without departing from the principles thereof, and such other embodiments are meant to come within the scope of the present invention as defined by the appended claims.

What is claimed is:

1. An assembly for a vehicle having a tailgate, the assembly comprising a plate for attachment to the tailgate and having an upper and a pair of side edges when attached to the tailgate with the tailgate in a closed position, a panel which has an edge along which said panel is hingedly connected to said upper edge of said plate for serving as an alternative tailgate, wherein said plate upper edge has a length which is substantially equal to a length of said alternative tailgate panel edge, and a pair of side panels hingedly connected to said side edges respectively of said plate whereby, with the side panels vertically disposed, the alternative tailgate panel is hingedly movable while the tailgate is in a horizontal position between a closed position wherein the alternative tailgate panel is vertical and an open position wherein the alternative tailgate panel forms an angle of about 180 degrees with the tailgate, the assembly further comprising a pair of cables connected to said alternative tailgate panel and attachable to the vehicle for deploying said alternative tailgate panel in the open position.

2. An assembly for a vehicle having a tailgate, the assembly comprising a plate for attachment to the tailgate and having an upper and a pair of side edges when attached to the tailgate with the tailgate in a closed position, a panel hingedly connected to said upper edge of said late for serving as an alternative tailgate, at least one side panel hingedly connected to one of said side edges of said plate, and a pair of cables connected to said alternative tailgate panel and attachable to the vehicle for deploying said alternative tailgate panel in an open position wherein said alternative tailgate panel forms an angle of about 180 degrees with the tailgate when the tailgate is in the open position, the assembly further comprising at least one cavity in a side edge of said alternative tailgate panel for storing at least one of said cables.

3. An assembly according to claim 1 further comprising at least one clip on at least one of said side panels for receiving a respective one of said cables for maintaining position of said at least one side panel.

4. An assembly according to claim 1 further comprising a fastener for detachably attaching said alternative tailgate panel to at least one of said side panels.

5. An assembly according to claim 1 further comprising a clip for releasably attaching a rear edge of at least one of said side panels to said alternative tailgate panel.

6. An assembly according to claim 1 wherein said plate is detachably attached to the tailgate.

7. An assembly according to claim 1 wherein said plate is attached to the inner surface of the tailgate.

8. An assembly for a vehicle having a tailgate which has an upper and a pair of side edges when the tailgate is in a closed position, the assembly comprising a panel which serves as an alternative tailgate, at least one side panel, and means for hingedly connecting said alternative tailgate panel to the upper edge of the tailgate, means for deploying said alternative tailgate panel to an open position wherein said alternative tailgate panel forms an angle of about 180 degrees with the tailgate when the tailgate is in the open position, means for hingedly connecting said at least one side panel to one of the side edges of the tailgate, and at least one light fixture on said alternative tailgate panel and positioned for viewing when said alternative tailgate panel is in either an open or a closed position.

9. An assembly according to claim 8 further comprising a plate for attachment to the tailgate, said alternative tailgate panel and said at least one side panel being hingedly connected to said plate.

10. An assembly according to claim 8 wherein said deploying means comprises a pair of cables connected to said alternative tailgate panel and attachable to the vehicle and at least one cavity in a side edge of said alternative tailgate panel for storing at least one of said cables.

11. An assembly according to claim 8 further comprising a clip for releasably attaching a rear edge of said at least one side panel to said alternative tailgate panel.

12. An assembly according to claim 8 further comprising a fastener for detachably attaching said alternative tailgate panel to said at least one side panel.

13. An assembly according to claim 1 further comprising at least one light fixture on said alternative tailgate panel and positioned for viewing when said alternative tailgate panel is in either an open or a closed position.

14. An assembly according to claim 4 further comprising at least one clip on said at least one side panel for receiving said respective cable for maintaining position of said at least one side panel.

15. An assembly according to claim 1 wherein the assembly is composed of aluminum.

16. An assembly according to claim 2 further comprising at least one light fixture on said alternative tailgate panel and positioned for viewing when said alternative tailgate panel is in either an open or a closed position.

17. An assembly according to claim 2 wherein two of said side panel are hingedly connected to said side edges respectively of said plate.

* * * * *

UNITED STATES PATENT AND TRADEMARK OFFICE
CERTIFICATE OF CORRECTION

PATENT NO. : 7,021,689 B2  Page 1 of 1
APPLICATION NO. : 10/772523
DATED : April 4, 2006
INVENTOR(S) : Leonard A. Weisbeck, III It is certified that error appears in the above-identified patent and that said Letters Patent is hereby corrected as shown below:

Column 8,
Line 57, "late" should be --plate--.

Signed and Sealed this

Sixth Day of February, 2007

JON W. DUDAS
*Director of the United States Patent and Trademark Office*